United States Patent
Bastide et al.

(10) Patent No.: US 10,783,475 B2
(45) Date of Patent: Sep. 22, 2020

(54) DETECTING USER PROXIMITY IN A PHYSICAL AREA AND MANAGING PHYSICAL INTERACTIONS

(71) Applicant: International Business Machines Corporation, Armonk, NY (US)

(72) Inventors: Paul R. Bastide, Boxford, MA (US); Matthew E. Broomhall, Goffstown, NC (US); Liam S. Harpur, Skerries (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/833,421

(22) Filed: Dec. 6, 2017

(65) Prior Publication Data
US 2019/0171991 A1 Jun. 6, 2019

(51) Int. Cl.
*G06Q 10/10* (2012.01)
*G06Q 10/06* (2012.01)
*H04W 4/02* (2018.01)

(52) U.S. Cl.
CPC ....... *G06Q 10/06395* (2013.01); *G06Q 10/10* (2013.01); *H04W 4/023* (2013.01)

(58) Field of Classification Search
CPC .. G06Q 10/06395; G06Q 10/10; H04W 4/023
See application file for complete search history.

(56) References Cited

U.S. PATENT DOCUMENTS

| 8,055,721 | B2 | 11/2011 | O'Sullivan et al. |
| 9,300,790 | B2 | 3/2016 | Gainsboro et al. |
| 9,443,521 | B1 | 9/2016 | Olguin Olguin et al. |
| 2009/0248436 | A1* | 10/2009 | Takagi .................. G06F 3/0482 705/1.1 |
| 2012/0105324 | A1* | 5/2012 | Lee .................... H04M 1/72522 345/157 |

(Continued)

OTHER PUBLICATIONS

Ranganath et al., Detecting Friendly, Flirtatious, Awkward, and Assertive Speech in Speed-Dates, SciVerse ScienceDirect, Computer Speech and Language 27, 2013, pp. 89-115.

(Continued)

*Primary Examiner* — Pan G Choy
(74) *Attorney, Agent, or Firm* — L. Jeffrey Kelly; SVL IPLaw

(57) ABSTRACT

A system manages physical interactions between users. The system analyzes wireless signals transmitted by a plurality of user devices within a physical area to identify one or more first users within proximity of a second user in the physical area. Actions of the second user are monitored to determine a level of concentration of the second user in performing a task. A probability of a physical interaction of the one or more first users with the second user causing loss of focus by the second user is determined, and physical interactions of the one or more first users with the second user are managed based on the determined probability to maintain focus of the second user on the task. Embodiments of the present invention further include a method and computer program product for managing physical interactions between users in substantially the same manner described above.

20 Claims, 3 Drawing Sheets

(56) References Cited

U.S. PATENT DOCUMENTS

2015/0177939 A1* 6/2015 Anderson ............... G06F 3/017
  715/745
2016/0255068 A1* 9/2016 Pritchard ............. H04W 4/025
  726/7

OTHER PUBLICATIONS

Powers et al., Implicitly Priming the Social Brain: Failure to Find Neural Effects, PLOS ONE 8(2), Feb. 20, 2013, pp. 1-5.

Anonymous, Mood Advisor Based on a User's Online and Device Activity, an IP.com Prior Art Database Technical Disclosure, IPCOM000237826D, Jul. 15, 2014, 15 pages.

Anonymous, A Method and System for Mildly Discouraging Social Norm Violations in Public, an IP.com Prior Art Database Technical Disclosure, IPCOM000230869D, Sep. 16, 2013, 4 pages.

How to Prevent Being Startled by Co-Workers While Listening to Music at Your Desk?, Lifehacks Stack Exchange, http://lifehacks.stackexchange.com/questions/13444/how-to-prevent-being-startled-by-co-workers-while-listening-to-music-at-your-des . . . , retrieved from internet Nov. 2017, 3 pages.

Costumero, Bluetooth Finder, Android Apps on Google Play, Google, 2017, 4 pages.

James, Great Agile Workspaces: Multitasking and Distractions, http://lunatractor.com/blog/2011/05/13/great-agile-workspaces . . . , May 13, 2011, 6 pages.

* cited by examiner

DETECTING USER PROXIMITY IN A PHYSICAL AREA AND MANAGING PHYSICAL INTERACTIONS

BACKGROUND

1. Technical Field

Present invention embodiments relate to detection systems, and more specifically, to detecting proximity of users to each other within a physical space and managing physical user interactions.

2. Discussion of the Related Art

In workplace environments, individuals often get interrupted by attempted ad-hoc physical interactions with other individuals. For example, an individual may be working in a cubicle, and occasionally various people at different times of a workday may come over and interact with the individual. This can be troublesome for the individual since the individual has the burden to manage the interaction with multiple parties. Further, the individual may become startled when focused on a task.

For example, the individual may be focused on software coding while listening to music using headphones or earbuds. The individual is located in an agile workspace where the individual may be approached by other individuals. The individual may be interrupted by another individual and become very startled (or jump). This interruption may be due to another individual coming behind the focused individual, where the focused individual suddenly notices the other individual and becomes startled. Alternatively, another individual may come behind the focused individual and initiate conversation, but the focused individual is unaware and oblivious to the other individual. Eventually, the focused individual suddenly notices the other individual and becomes startled, thereby losing their focus on the desired task. The resulting injection of adrenaline for the focused individual may prolong the time for the focused individual to regain their focus on the desired task. Further, the startling of the focused individual may lead to mistakes, and over time affect the effectiveness of teams.

SUMMARY

According to one embodiment of the present invention, a system manages physical interactions between users and includes at least one processor. The system analyzes wireless signals transmitted by a plurality of user devices within a physical area to identify one or more first users within proximity of a second user in the physical area. Actions of the second user are monitored to determine a level of concentration of the second user in performing a task. A probability of a physical interaction of the one or more first users with the second user causing loss of focus by the second user is determined, and physical interactions of the one or more first users with the second user are managed based on the determined probability to maintain focus of the second user on the task. Embodiments of the present invention further include a method and computer program product for managing physical interactions between users in substantially the same manner described above.

BRIEF DESCRIPTION OF THE DRAWINGS

Generally, like reference numerals in the various figures are utilized to designate like components.

DETAILED DESCRIPTION

Figure 1:
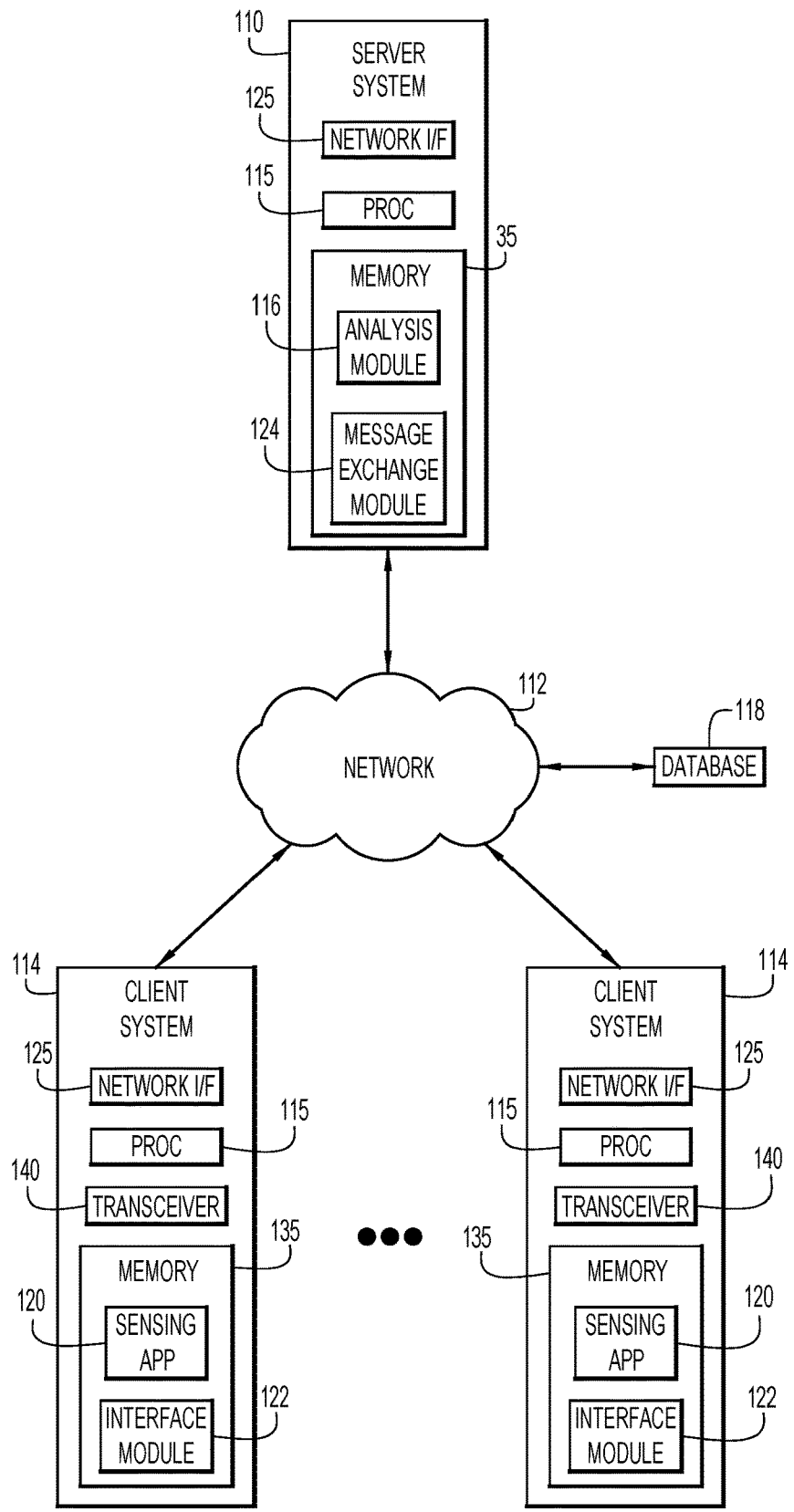
FIG. 1 is a diagrammatic illustration of an environment of an embodiment of the present invention.

An embodiment of the present invention detects proximity of users within a physical area and manages physical interactions between users to avoid conflicts among multiple parties and/or startled states of users arising from interruptions while engaged in a task. For example, an embodiment of the present invention may detect when multiple parties are going to travel to a location of an individual for physical interaction, thereby leading to conflicts. When this event is detected, an embodiment of the present invention may ensure that the multiple parties resolve the conflicts among themselves.

Alternatively, an embodiment of the present invention may resolve the conflicts by enforcing ordered connections, such as by using explicit rules or business policies. For example, when the multiple parties travel to the individual, a chat may be initiated informing the individual of the next party with whom to interact. Further, the parties may be subject to rules imposed by the individual, or rules imposed by the business or organization to resolve the next party with whom the individual may communicate. In other words, an embodiment of the present invention resolves conflicts serially, or may inform a party that the individual does not want to be disturbed.

Present invention embodiments ensure that an individual is not subject to an unmanageable peak or startled state. The orchestration of opportune physical interactions is managed in a way that guarantees there are no startled states for the individual. Further, a negotiation stage is provided for potential interactions that are likely to cause a startled state.

Present invention embodiments leverage electromagnetic fields produced from wireless communication devices, such as communication devices using BLUETOOTH, to ascertain a probability of a physical interaction between a user roaming or traveling in a physical area and another user in the physical area engaged in a task. An embodiment of the present invention ascertains and leverages a model of past wireless and physical world interactions to determine the probability of a physical interaction between the roaming user and the engaged user. The probability of a negative interaction leading to a startled state of the engaged user is based on a concentration factor indicating a level of concentration by the engaged user in performing the task. The concentration factor may be based on orientation/use of headphones, analysis of images of involved parties, etc. When the probability of a negative interaction is above a threshold, an embodiment of the present invention informs, or negotiates (using a mobile device) with, the roaming user, or simply broadcasts to the roaming user that the engaged user is currently performing a task and should not be disturbed.

Present invention embodiments may provide a virtual closed door (or do not disturb indication) to any or all roaming users traveling within proximity of an engaged user. This may be augmented by rules applied by the engaged user to minimize conflicts and negative interactions at times when disruption in workflow would be highest. The users may participate in a virtual wireless, or BLUETOOTH, mesh network, which may be utilized to navigate conflicts and manage available times for physical interaction with engaged users throughout a large active area, such as an agile workplace. The mesh network may be used to overcome limitations of wireless transmit/receive distances, and enables short-burst wireless communications. The mesh network may be used for various network topologies, and may establish a many-to-many type of device communications.

Present invention embodiments provide several advantages. For example, users may become more efficient since physical world interruptions may be managed in a more controlled fashion. Further, users may negotiate among themselves as to the appropriateness of the interaction given the concentration level of the user.

An example environment of an embodiment of the present invention is illustrated in FIG. 1. Specifically, the environment includes one or more server systems 110, and one or more client or end-user devices 114. Server systems 110 and client devices 114 may be remote from each other and communicate over a network 112. The network 112 may be implemented by any number of any suitable communications media, such as a wide area network (WAN), a local area network (LAN), Internet, Intranet, etc. Alternatively, server systems 110 and client devices 114 may be local to each other, and communicate via any appropriate local communication medium, such as a local area network (LAN), hardwire, wireless links, Intranet, etc.

Each client device 114 detects the presence of other client devices 114 (or users) within a desired proximity, and enables users to interact with server systems 110 to perform desired actions. Server systems 110 include an analysis module 116 and a message exchange module 124. Analysis module 116 analyzes the proximity of users within a physical area and manages conflicts and physical interactions between the users as described below. Message exchange module 124 may provide any type of messaging system or message exchange platform for users to exchange messages, such as texts, chat sessions, electronic mail (email), etc. Analysis module 116 may interact with, or be included within, message exchange module 124.

A database system 118 may store various information for managing conflicts and physical user interactions, such as proximity information of users within the physical area, etc. The database system 118 may be implemented by any conventional or other database or storage unit, may be local to or remote from server systems 110 and client devices 114, and may communicate via any appropriate communication medium, such as a local area network (LAN), a wide area network (WAN), Internet, hardwire, wireless link, Intranet, etc.

Client devices 114 may include a sensing application 120 and an interface module 122. Sensing application 120 detects wireless communication signals from neighboring client devices 114, and provides information to database system 118 for analysis. Interface module 122 enables users to interact with server systems 110 to perform desired actions. For example, interface module 122 may include a browser to interact with various network sites and/or message exchange platforms. By way of further example, interface module 122 may include various applications to interact with server systems 110 including the message exchange platform. The client devices 114, via interface module 122, may present a graphical user or other interface to solicit information from users pertaining to the desired actions, and may provide displays or interfaces presenting results of the actions. The interface may include a GUI, command line prompts, menu screens, etc.

Server systems 110 may be implemented by any conventional or other computer systems. The server systems 110 are preferably equipped with a display or monitor, a base, optional input devices, and any commercially available and custom software. The base preferably includes at least one hardware processor 115, such as a microprocessor, controller, central processing unit (CPU), etc., one or more memories 135, and internal or external network interfaces or communications devices 125. The communications devices may include a modem, network cards, etc., while the input devices may include a keyboard, mouse, touch screen, or other input device. The software may include server/communications software, analysis module 116, message exchange module 124, etc., and is provided for execution by at least one hardware processor 115.

Client devices 114 are preferably implemented by any conventional or other portable computing systems, such as a laptop, tablet, smartphone or other mobile computing device, etc. The client devices 114 are preferably equipped with a display or monitor, a base, optional input devices, and any commercially available and custom software. The base preferably includes at least one hardware processor 115, such as a microprocessor, controller, central processing unit (CPU), etc., one or more memories 135, and internal or external network interfaces or communications devices 125. The communications devices may include a modem, network cards, etc., while the input devices may include a keyboard, mouse, touch screen, camera or image capture device, or other input device. Client devices 114 further include a transceiver 140 to communicate wirelessly with various devices based on any suitable protocols, such as BLUETOOTH. The transceiver may be implemented by any conventional or other transceiver to send and receive wireless signals. Alternatively, the client devices 114 may include any conventional or other receiver and transmitter to send and receive wireless signals. The software may include communications software, sensing application 120, interface module 122, etc., and is provided for execution by at least one hardware processor 115.

The analysis module 116, sensing application 120, interface module 122, and message exchange module 124 may include one or more modules or units to perform the various functions of present invention embodiments described below. These modules may be implemented by any combination of any quantity of software and/or hardware modules or units, and may reside within memory 135 of the server systems 110 and/or client devices 114 for execution by processor 115.

Initially, a user, business, or other entity may enable the functionality of managing conflicts and/or physical interactions of present invention embodiments in a messaging system or message exchange platform provided by message exchange module 124 of server system 110. The functionality may be enabled for particular desired circumstances. For example, the functionality may be enabled for all physical interactions where a concentration level of a user engaged in a task is above a certain level. Further, the functionality may be employed for users based on organizational and social network criteria, such as enabling the functionality for individuals having a senior role in an organization relative to other users.

Users of an organization or other entity are each associated with a client device 114 containing transceiver 140 to transmit and receive wireless signals for communication. Users register with analysis module 116 of server system 110 from client devices 114 to associate the users with identifiers of the client devices 114. The registration may be accomplished via interface module 122 of client devices 114 to provide the appropriate information, such as name of the user, client device identification, network address or other information, etc.

Figure 2:
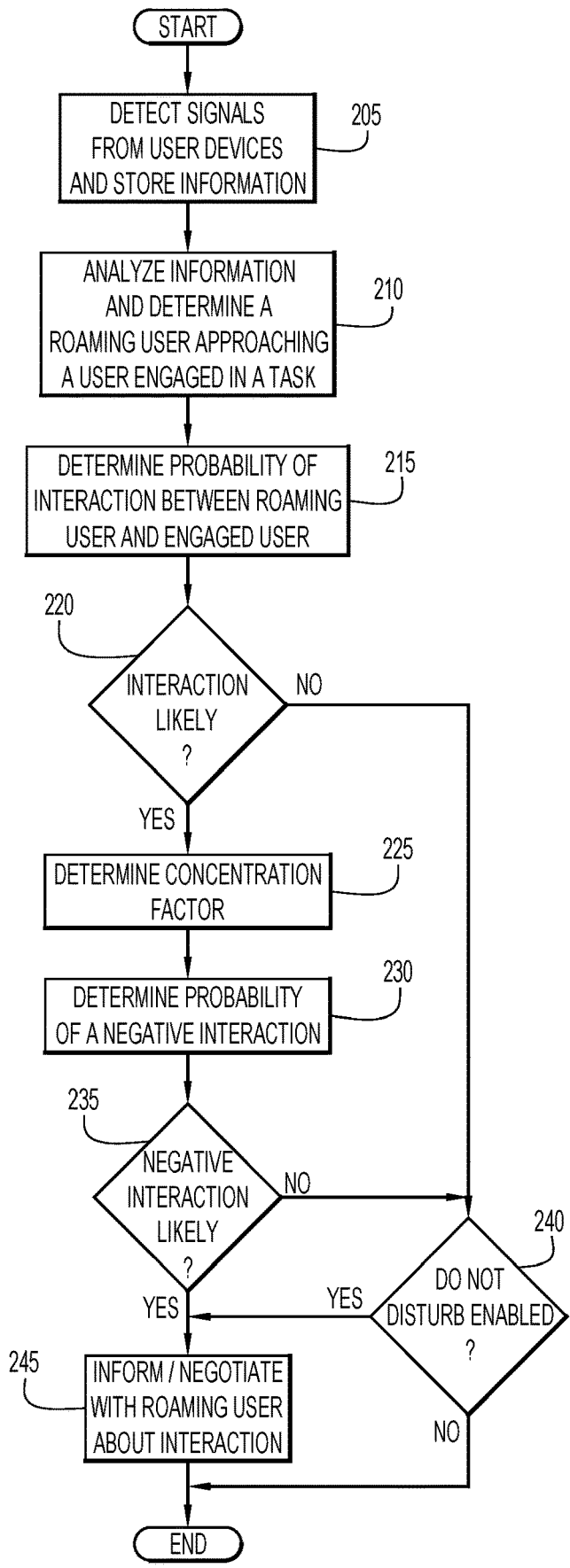
FIG. 2 is a procedural flowchart illustrating a manner of detecting a user within a proximity of another user in a physical area and managing interactions between the users according to an embodiment of the present invention.

A manner of detecting a user within a proximity of another user in a physical area and managing interactions between the users according to an embodiment of the present invention is illustrated in FIG. 2. Initially, sensing application 120 of each client device 114 detects signals transmitted from other client devices 114 in a physical area at step 205. Each client device 114 may detect a desired quantity of closest other client devices 114. By way of example, the quantity of detected client devices 114 is preferably in the range of one to ten, however, any quantity of client devices 114 may be detected. The physical area may be any desired area or space of any size or dimensions, such as a workplace. Information is derived from the detected signals and stored in database system 118. The transmitted signals form an electromagnetic field proximate the associated client device 114 and may be detected by transceiver 140. The signals may be transmitted according to various communication protocols, such as BLUETOOTH, etc.

Sensing application 120 may be implemented by any conventional or other application to detect and interpret the transmitted signals. The information derived from the detected signals preferably includes an identifier for the transmitting client device, a network address or location, make and model of the client device, signal strength, etc. This information may be stored in a record of database system 118 for the client device 114 detecting the signals. The record may further include a client device name, geographical movement of the corresponding electromagnetic field, and real world interactions with another user. The real world interactions may be derived from data of other channels, such as audio from nearby devices denoting a real-world interaction, a time when physical proximity overlapped with a change of focus or activity for a user engaged on a task, etc. The database system 118 varies over time as user information changes, and may be used to ascertain a probability of an interaction between users based on prior behavior as described below.

Analysis module 116 of server system 110 analyzes the information in database system 118 to determine a user roaming or travelling within the physical area that is approaching another user engaged in a task at step 210. The engaged user preferably remains at a location in the physical area to perform the task. The analysis module 116 basically maps movements of client devices 114 over time based on the detected signals or electromagnetic fields. Since the client device identifiers within the analyzed information are associated with corresponding users during user registration as described above, analysis module 116 determines the identities of the roaming user and engaged user based on the corresponding client device identifiers.

Analysis module 116 determines when a roaming user is approaching an engaged user based on the signal strengths of corresponding client devices 114 stored in database system 118. Since the signal strengths are proportional to distance, analysis module 116 may determine when the roaming user is within proximity, or a certain range, of the engaged user. For example, the measured signal strength of a client device 114 of the roaming user may be compared to a corresponding signal threshold to determine when the roaming user is within proximity of the engaged user. The signal threshold indicates a signal strength level corresponding to a certain distance from the engaged user. When the signal strength exceeds the signal threshold, the roaming user is considered in the proximity of the engaged user. Alternatively, the distance may be determined from the signal strength, and compared to a distance threshold representing a range for the roaming user to be considered in proximity of the engaged user. When the distance is less than the distance threshold, the roaming user is considered in the proximity of the engaged user. The signal and distance thresholds may correspond to a distance or range of any desired values, but preferably correspond to a distance or range on the order of a few inches to ten feet.

When a roaming user is identified as approaching the engaged user, the probability of interaction between the roaming and engaged users is determined at step 215. The interaction is preferably an in-person or physical interaction that may include engaging in a conversation, or any other activity preventing, or diverting the attention of, the engaged user from performance of the task. The probability of interaction may be determined by utilizing a model of past locations and physical world interactions of the roaming user based on the information stored in database system 118. For example, various machine learning and/or statistical techniques may be employed to determine a probability of interaction between the roaming and engaged users. The machine learning and/or statistical techniques may employ various models, including neural networks, clustering techniques, frequency analysis, averaging, and distribution (or bell curve) analysis to determine a probability of the interaction. By way of example, frequent interactions between the roaming and engaged users over time indicate a high probability or likelihood that the roaming and engaged users interact when the roaming user is within the desired range of the engaged user.

The determined probability of the interaction is compared to an interaction threshold at step 220 to determine a likelihood of interaction between the roaming and engaged users. The interaction threshold may be set to any desired values, such as 50%, 75%, 90%, etc. chance of an interaction. When the probability exceeds the interaction threshold and an interaction is likely, a concentration factor for the engaged user is determined at step 225. The concentration factor provides an indication of a state of concentration or focus of the engaged user. The concentration factor may be based on monitoring of the engaged user for certain characteristics. This may be accomplished by capturing images of the engaged user via an image capture device or camera of the client device 114 of the engaged user. Conventional or other image processing techniques may be employed to identify the characteristics within the captured images of the engaged user. For example, orientation and/or use of headphones by the engaged user, focus of a gaze of the engaged user, motion of the engaged user, etc. may be utilized to determine a concentration state. By way of example, minimal motion and/or gazing for durations at a same specific location may indicate a high state of concentration.

The presence and/or amounts of these various characteristics may be used to determine a value for the concentration factor. For example, the time duration of minimal motion or gazing at the same specific location by an engaged user may be used to determine the value for the concentration factor.

A probability of a negative interaction between the roaming and engaged users is determined at step 230. An interaction is considered to be a negative interaction when the engaged user is likely to be startled by the interaction, thereby losing focus in performing the task. The likelihood of being startled is based on the concentration factor. For example, the greater the concentration by the engaged user on a task, the more likely the engaged user is startled by the interaction. The probability of a negative interaction may be represented by the concentration factor. In this case, when the interaction is likely and the concentration factor indicates a satisfactory state of concentration of the engaged user to cause startling, the interaction is considered to be a negative interaction. The concentration factor may be compared to a concentration threshold representing sufficient concentration to produce a startled state. When the concentration factor exceeds the threshold, the engaged user is considered to enter a startled state from an interaction. The concentration threshold may be set to any desired values, and may be based on concentration factors of prior interactions resulting in a startled state.

Further, the probability of the negative interaction may be determined based on the probability of the interaction and the concentration factor. For example, the probability of interaction may be weighted by the concentration factor to determine the probability of a negative interaction. However, the probability of an interaction and the concentration factor may be combined in any desired fashion to produce the probability of a negative interaction.

Moreover, the probability of a negative interaction may be determined and/or adjusted by utilizing a model analyzing a history of interactions, attempted interactions, and concentration factors based on the information stored in database system 118. For example, various machine learning and/or statistical techniques may be employed to determine a probability of negative interaction between the roaming and engaged users. The machine learning and/or statistical techniques may employ various models, including neural networks, clustering techniques, frequency analysis, averaging, and distribution (or bell curve) analysis to determine a probability of the negative interaction. By way of example, various combinations of attempted interactions and concentration factors may be analyzed to determine a likelihood of a negative interaction. The likelihood may be represented as the probability of a negative interaction, or as an adjustment to a probability of the negative interaction. For example, a determined probability of a negative interaction may be increased based on the models indicating similar conditions producing a negative interaction.

The determined probability of the negative interaction is compared to a negative interaction threshold at step 235 to determine a likelihood of a negative interaction between the roaming and engaged users. The negative interaction threshold may be set to any desired values, such as 50%, 75%, 90%, etc. chance of a negative interaction. When the probability of a negative interaction exceeds the negative interaction threshold indicating that a negative interaction is likely, the roaming user is informed of, or permitted to negotiate, about the attempted interaction using a client device 114 at step 245. For example, the roaming user may be notified on client device 114 to avoid interacting with the engaged user via message exchange module 124 of server system 110. The roaming user may stop or delay the attempted interaction in response to the notification. Further, the roaming user may request notification to attempt the interaction at a later time. Analysis module 116 of server system 110 may notify the roaming user via message exchange module 124 when the engaged user is available. This may be determined by analysis module 116 based on a change in the concentration factor indicating a lesser state of concentration of the engaged user.

When an interaction or negative interaction is not likely as determined at steps 220, 235, analysis module 116 of server system 110 determines a presence of a private (or do not disturb) mode of the engaged user at step 240. A user may enable this mode to prevent interactions during a specified time interval. When the private mode is enabled, the roaming user is informed of, or permitted to negotiate, about the attempted interaction using a client device 114 at step 245. For example, the roaming user may be notified on client device 114 to avoid interacting with the engaged user via message exchange module 124 of server system 110. The roaming user may stop or delay the attempted interaction in response to the notification. Further, the roaming user may request notification to attempt the interaction at a later time. Analysis module 116 of server system 110 may notify the roaming user via message exchange module 124 when the engaged user is available, such as when the engaged user has a lesser state of concentration, the private mode is disabled, etc.

The analysis module 116 may analyze the information periodically, or at any desired or specified time intervals, to identify roaming users and engaged users within proximity of each other and manage interactions for the identified roaming and engaged users in substantially the same manner described above.

Figure 3:
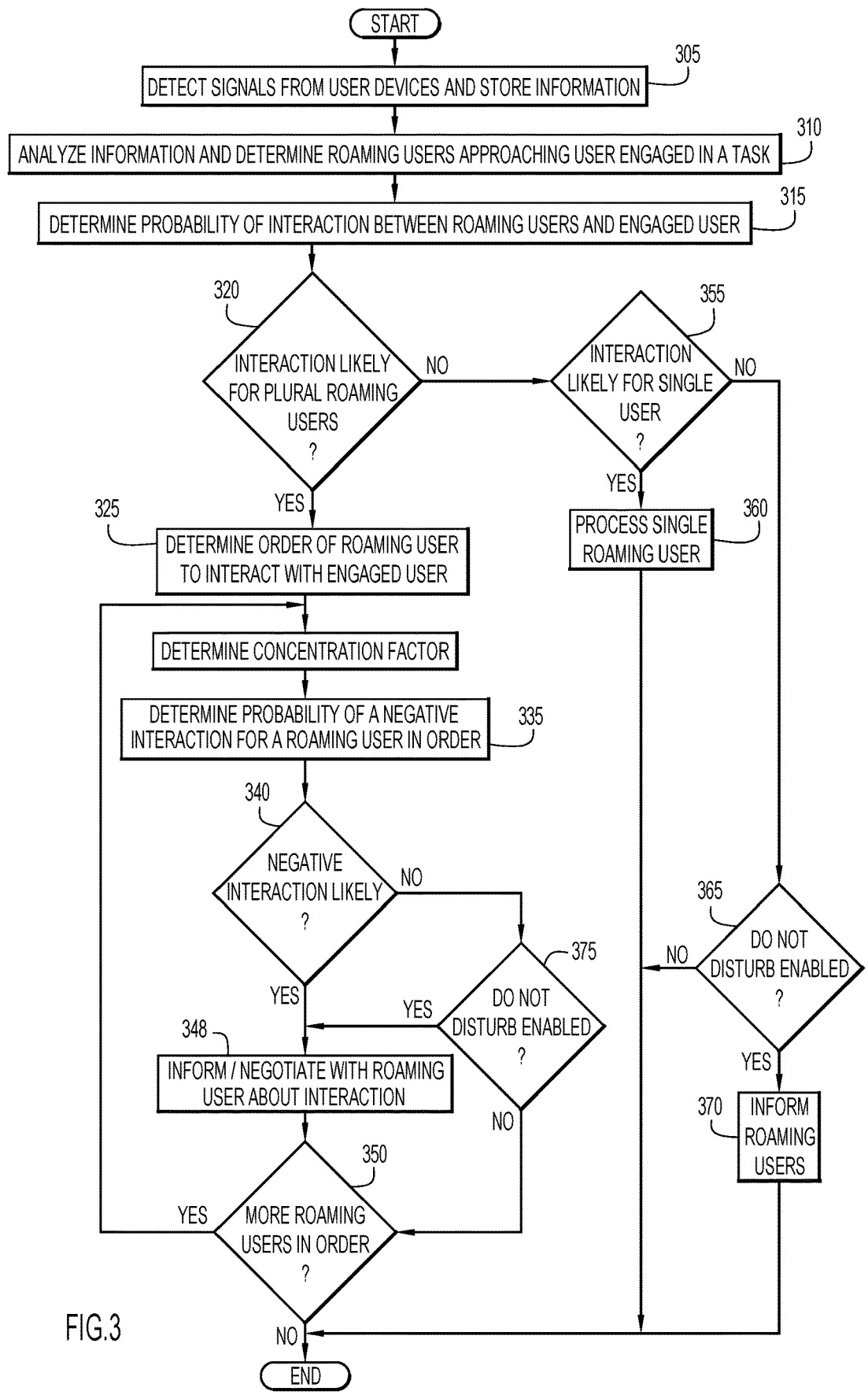
FIG. 3 is a procedural flowchart illustrating a manner of detecting a plurality of users within a proximity of another user in a physical area and managing conflicts and interactions between the users according to an embodiment of the present invention.

A manner of detecting a plurality of users within a proximity of another user in a physical area and managing conflicts and interactions between the users according to an embodiment of the present invention is illustrated in FIG. 3. Initially, sensing application 120 of each client device 114 detects signals transmitted from other client devices 114 in a physical area at step 305. Each client device 114 may detect a desired quantity of closest other client devices 114. By way of example, the quantity of detected client devices 114 is preferably in the range of one to ten, however, any quantity of client devices 114 may be detected. The physical area may be any desired area or space of any size or dimensions, such as a workplace. Information is derived from the detected signals and stored in database system 118. The transmitted signals form an electromagnetic field proximate the associated client device 114 and may be detected by transceiver 140. The signals may be transmitted according to various communication protocols, such as BLUETOOTH, etc.

Sensing application 120 may be implemented by any conventional or other application to detect and interpret the transmitted signals as described above. The information derived from the detected signals preferably includes an identifier for the transmitting client device, a network address or location, make and model of the client device, signal strength, etc. This information may be stored in a record of database system 118 for the client device 114 detecting the signals. The record may further include a client device name, geographical movement of the corresponding electromagnetic field, and real world interactions with another user. The real world interactions may be derived from data of other channels, such as audio from nearby devices denoting a real-world interaction, a time when physical proximity overlapped with a change of focus or activity for a user engaged on a task, etc. The database system 118 varies over time as user information changes, and may be used to ascertain a probability of an interaction between users based on prior behavior as described below.

Analysis module 116 of server system 110 analyzes the information in database system 118 to determine one or more users roaming within the physical area that are approaching another user engaged in a task at step 310. The engaged user preferably remains at a location in the physical area to perform the task as described above. The analysis module 116 basically maps movements of client devices 114 over time based on the detected signals or electromagnetic fields. Since the client device identifiers within the analyzed information are associated with corresponding users during user registration as described above, analysis module 116 determines the identities of the roaming users and engaged user based on the corresponding client device identifiers.

Analysis module 116 determines when one or more roaming users are approaching an engaged user based on the signal strengths of corresponding client devices 114 stored in database system 118. Since the signal strengths are proportional to distance, analysis module 116 may determine when each roaming user is within proximity, or a certain range, of the engaged user. For example, the measured signal strength of client device 114 of each roaming user may be compared to a corresponding signal threshold to determine when the roaming user is within proximity of the engaged user. The signal threshold indicates a signal strength level corresponding to a certain distance from the engaged user. When the signal strength exceeds the signal threshold, the roaming user is considered in the proximity of the engaged user. Alternatively, the distance may be determined from the signal strength, and compared to a distance threshold representing a range for the roaming user to be considered in proximity of the engaged user. When the distance is less than the distance threshold, the roaming user is considered in the proximity of the engaged user. The signal and distance thresholds may correspond to a distance or range of any desired values, but preferably correspond to a distance or range on the order of a few inches to ten feet.

When one or more roaming users are identified as approaching the engaged user, the probability of interaction between the roaming and engaged users is determined at step 315. The interaction is preferably an in-person or physical interaction that may include engaging in a conversation, or any other activity preventing, or diverting the attention of, the engaged user from performance of the task. The probability of interaction may be determined by utilizing a model of past locations and physical world interactions of each roaming user based on the information stored in database system 118. For example, various machine learning and/or statistical techniques may be employed to determine a probability of interaction between the roaming and engaged users. The machine learning and/or statistical techniques may employ various models, including neural networks, clustering techniques, frequency analysis, averaging, and distribution (or bell curve) analysis to determine a probability of the interaction. By way of example, frequent interactions between the roaming and engaged users over time indicate a high probability or likelihood that the roaming and engaged users interact when the roaming user is within the desired range of the engaged user.

The determined probability of the interaction for each of the one or more roaming users is compared to an interaction threshold at step 320 to determine a likelihood of interaction between each roaming user and the engaged user. The interaction threshold may be set to any desired values, such as 50%, 75%, 90%, etc. chance of an interaction. When an interaction is likely for a single roaming user as determined at step 355 based on the corresponding probability exceeding the interaction threshold, the interaction of the single user with the engaged user is managed at step 360 in the manner described above for FIG. 2, for example, at steps 225 to 245.

When an interaction is not likely for any of the roaming users as determined at steps 320 and 355 based on the corresponding probabilities not exceeding the interaction threshold, analysis module 116 of server system 110 determines a presence of a private (or do not disturb) mode of the engaged user at step 365. A user may enable this mode to prevent interactions during a specified time interval. When the private mode is enabled, each roaming user is informed of, or permitted to negotiate, about the attempted interaction using a client device 114 at step 370. For example, a roaming user may be notified on client device 114 to avoid interacting with the engaged user via message exchange module 124 of server system 110. A roaming user may stop or delay an attempted interaction in response to the notification. Further, a roaming user may request notification to attempt the interaction at a later time. Analysis module 116 of server system 110 may notify a roaming user via message exchange module 124 when the engaged user is available, such as when the engaged user has a lesser state of concentration, the private mode is disabled, etc.

When an interaction is likely for a plurality of roaming users based on the corresponding probabilities exceeding the interaction threshold, this represents a conflict between the plurality of roaming users. Accordingly, analysis module 116 of sever system 110 determines an order for each of the plurality of roaming users to interact with the engaged user to resolve the conflicts at step 325. The order may be determined in various manners. For example, the attempted interactions with the engaged user by the plurality of roaming users may initially be queued as virtual interruptions, where the interactions that are likely to be negative are diffused as described below. The conflicts are subsequently resolved in a manner avoiding startling of the engaged user.

Pre-defined rules may be applied to the conflicting interactions or plurality of users to resolve the conflicts and determine an order of interaction. The rules may indicate, by way of example, to: provide a user interface, audio, or other notifications; to provide a recommendation to a roaming user to use a different channel at this time to interact with the engaged user; or to provide criteria for prioritizing or ordering the interactions. The criteria for prioritizing may be based on organizational roles, an importance of a reason for the interaction, certain users having priority, etc. For example, analysis module 116 of server system 110 may direct message exchange module 124 to initiate a chat informing the engaged user of a next party with whom to interact. Further, the rules may be provided or imposed by the engaged user, or by a business, organization, or other entity to resolve conflicts and indicate a next party with whom the engaged user may communicate. In other words, conflicts may be resolved serially, and/or a roaming user may be informed that the engaged user does not want to be disturbed as described below.

Analysis module 116 of server system 110 may further direct message exchange module 124 to provide a message to a roaming user indicating that an attempted interaction was subject to a conflict and is in the process of being resolved. Further, the rules for handling a conflict may be advertised to the plurality of roaming users in conflict. For example, the notification of the rules may indicate that a conflict exists and the plurality of roaming users in conflict have an option of interacting at a later time or using different channels. In addition, analysis module 116 may direct message exchange module 124 to provide a message to each of the roaming users to resolve the conflicts among themselves. In this case, message exchange module 124 may enable the roaming users to communicate over the message exchange platform to resolve the conflicts, and/or analysis module 116 may provide a user interface to receive information from the roaming users pertaining to resolving the conflicts.

Once the conflicts are resolved and an order of interactions is determined, a concentration factor for the engaged user is determined at step 330. The concentration factor provides an indication of a state of concentration or focus of the engaged user as described above. The concentration factor may be based on monitoring of the engaged user for certain characteristics. This may be accomplished by capturing images of the engaged user via an image capture device or camera of the client device 114 of the engaged user. Conventional or other image processing techniques may be employed to identify the characteristics within the captured images of the engaged user. For example, orientation and/or use of headphones by the engaged user, focus of a gaze of the engaged user, motion of the engaged user, etc. may be utilized to determine a concentration state. By way of example, minimal motion and/or gazing for durations at a same specific location may indicate a high state of concentration.

The presence and/or amounts of these various characteristics may be used to determine a value for the concentration factor. For example, the time duration of minimal motion or gazing at the same specific location by an engaged user may be used to determine the value for the concentration factor.

A probability of a negative interaction between a roaming user in the determined order and the engaged user is determined at step 335. An interaction is considered to be a negative interaction when the engaged user is likely to be startled by the interaction, thereby losing focus in performing the task as described above. The likelihood of being startled is based on the concentration factor. For example, the greater the concentration by the engaged user on a task, the more likely the engaged user is startled by the interaction. The probability of a negative interaction may be represented by the concentration factor. In this case, when the interaction is likely and the concentration factor indicates a satisfactory state of concentration of the engaged user to cause startling, the interaction is considered to be a negative interaction. The concentration factor may be compared to a concentration threshold representing sufficient concentration to produce a startled state. When the concentration factor exceeds the threshold, the engaged user is considered to enter a startled state from an interaction. The concentration threshold may be set to any desired values, and may be based on concentration factors of prior interactions resulting in a startled state.

Further, the probability of the negative interaction may be determined based on the probability of the interaction and the concentration factor. For example, the probability of interaction may be weighted by the concentration factor to determine the probability of a negative interaction. However, the probability of an interaction and the concentration factor may be combined in any desired fashion to produce the probability of a negative interaction.

Moreover, the probability of a negative interaction may be determined and/or adjusted by utilizing a model analyzing a history of interactions, attempted interactions, and concentration factors based on the information stored in database system 118. For example, various machine learning and/or statistical techniques may be employed to determine a probability of negative interaction between a roaming user and engaged user. The machine learning and/or statistical techniques may employ various models, including neural networks, clustering techniques, frequency analysis, averaging, and distribution (or bell curve) analysis to determine a probability of the negative interaction. By way of example, various combinations of attempted interactions and concentration factors may be analyzed to determine a likelihood of a negative interaction. The likelihood may be represented as the probability of a negative interaction, or as an adjustment to a probability of the negative interaction. For example, a determined probability of a negative interaction may be increased based on the models indicating similar conditions producing a negative interaction.

The determined probability of the negative interaction is compared to a negative interaction threshold at step 340 to determine a likelihood of a negative interaction between a roaming user and the engaged user. The negative interaction threshold may be set to any desired values, such as 50%, 75%, 90%, etc. chance of a negative interaction. When the probability of a negative interaction exceeds the negative interaction threshold indicating that a negative interaction is likely, a roaming user is informed of, or permitted to negotiate, about the attempted interaction using a client device 114 at step 345. For example, the roaming user may be notified on client device 114 to avoid interacting with the engaged user via message exchange module 124 of server system 110. The roaming user may stop or delay the attempted interaction in response to the notification. Further, the roaming user may request notification to attempt the interaction at a later time. Analysis module 116 of server system 110 may notify the roaming user via message exchange module 124 when the engaged user is available. This may be determined by analysis module 116 based on a change in the concentration factor indicating a lesser state of concentration of the engaged user.

When a negative interaction is not likely as determined at step 340, analysis module 116 of server system 110 determines a presence of a private (or do not disturb) mode of the engaged user at step 375. A user may enable this mode to prevent interactions during a specified time interval. When the private mode is enabled, the roaming user is informed of, or permitted to negotiate, about the attempted interaction using a client device 114 at step 345. For example, a roaming user may be notified on client device 114 to avoid interacting with the engaged user via message exchange module 124 of server system 110. A roaming user may stop or delay the attempted interaction in response to the notification. Further, a roaming user may request notification to attempt the interaction at a later time. Analysis module 116 of server system 110 may notify a roaming user via message exchange module 124 when the engaged user is available, such as when the engaged user has a lesser state of concentration, the private mode is disabled, etc.

The above process, including for example steps 330-350 and 375, is repeated until each roaming user in the determined order is processed as determined at step 350.

The analysis module 116 may analyze the information periodically, or at any desired or specified time intervals, to identify roaming users and engaged users in proximity of each other and manage conflicts and interactions for the identified roaming and engaged users in substantially the same manner described above.

It will be appreciated that the embodiments described above and illustrated in the drawings represent only a few of the many ways of implementing embodiments for detecting user proximity in a physical area and managing physical interactions.

The environments of the present invention embodiments may include any number of computer or other processing systems, such as client or end-user systems, server systems, etc., and databases or other repositories arranged in any desired fashion, where the present invention embodiments may be applied to any desired type of computing environment. For example, the computing environment may include cloud computing, client-server, network computing, mainframe, stand-alone systems, etc. The computer or other processing systems employed by the present invention embodiments may be implemented by any number of any personal or other type of computer or processing system, such as a desktop, laptop, PDA, tablets, smartphones, mobile computing devices, etc., and may include any commercially available operating system and any combination of commercially available and custom software. The software may include browser software, communications software, server software, analysis module 116, sensing application 120, interface module 122, message exchange module 124, etc. These systems may include any types of monitors and input devices, such as a keyboard, mouse, voice recognition, and the like, to enter and/or view information.

It is to be understood that analysis module 116, sensing application 120, interface module 122, message exchange module 124, and other software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium of a stationary or portable program product apparatus or device for use with stand-alone systems or systems connected by a network or other communications medium. The computer useable medium may include magnetic or optical mediums, magneto-optic mediums, floppy diskettes, CD-ROM, DVD, memory devices, etc.

The communication network may be implemented by any number of any type of communications network, such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of wired or wireless connection for access to the network. Local communication media may be implemented by any suitable communication media, such as a local area network (LAN), hardwire, wireless link, Intranet, etc.

The system may employ any number of any conventional or other databases, data stores or storage structures, such as files, databases, data structures, data or other repositories, etc., to store information. The information may include: proximity information of users within the physical area, client device identifiers, network addresses, probabilities, histories of interactions, etc. The database system may be implemented by any number of any conventional or other databases, data stores or storage structures, such as files, databases, data structures, data or other repositories, etc., to store information. The database system may be included within or coupled to the server and/or client systems. The database systems and/or storage structures may be remote from or local to the computer or other processing systems, and may store any desired data.

The present invention embodiments may employ any number of any type of user interface, such as a Graphical User Interface (GUI), command-line, prompt, etc., for obtaining or providing information, where the interface may include any information arranged in any fashion. The information for the interface may include desired actions, messages, chats, notifications, etc. The interface may include any number of any types of input or actuation mechanisms, such as buttons, icons, fields, boxes, links, etc., disposed at any locations to enter/display information and initiate desired actions via any suitable input devices. The input devices may include a mouse, keyboard, and the like. The interface screens may include any suitable actuators, such as links, tabs, etc., to navigate between the screens in any fashion.

The report may include any information arranged in any fashion, and may be configurable based on rules or other criteria to provide desired information to a user.

The present invention embodiments are not limited to the specific tasks or algorithms described above, but may be utilized for resolving conflicts and/or managing any interactions in any desired environments or physical spaces. The engaged user may be performing any desired task or activity, and may be stationary or mobile within the physical area. The probabilities may be based on any desired models to determine a likelihood of interactions, and of negative interactions. The probabilities may be of any values of any formats, such as floating point numbers, percentages, etc. The thresholds may be set to any desired values, and may be compared based on any logical or mathematical operations, such as greater than, less than, greater than or equal to, less than or equal to, equal to, etc.

The concentration factor may be of any values and may be based on any desired information about a user engaged in a task, such as motion, focus, entry rate on or use of a user computing device, etc. Conflicts and negative interactions may be resolved in any desired fashion, such as by rules, analysis of a combination of user and/or interaction attributes, etc. Roaming users may be informed of conflicts or negative interactions in any manner, such as notifications, chats, emails, etc.

The private mode may be enabled by a user for any duration based on various criteria, such as occurrence of events or conditions, specified time intervals, etc. The private mode may be limited to certain users, or to certain activities or tasks of a user. The negotiation may include any desired requests and responses to determine a time for interaction. For example, a notification may be provided to avoid interacting with the engaged user, a request for specific times to interact may be submitted, a list of available times may be presented for selection, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing physical interactions between users comprising:
    detecting, via a transceiver, wireless signals transmitted by a plurality of user devices within a physical area over time as the plurality of user devices roam to different locations within the physical area and deriving strengths of the wireless signals detected during the roaming of the plurality of user devices;
    identifying, via a processor during the roaming, when the user devices of one or more first users roam within proximity of a user device of a second user in the physical area based on the strengths of the wireless signals transmitted by the plurality of roaming user devices;
    in response to identifying the user devices of the one or more first users during the roaming:
    monitoring actions of the second user, via the processor, to determine a level of concentration of the second user in performing a task, wherein monitoring actions of the second user includes capturing images of the second user and performing image processing on the captured images of the second user to determine the level of concentration based on an amount of motion of the second user identified within the captured images from the image processing;
    performing machine learning, via the processor, by applying a machine learning model to determine a probability of a physical interaction of the one or more first users with the second user causing loss of focus by the second user, wherein the machine learning model is trained with past locations and physical interactions of the users of the plurality of user devices; and
    managing, via the processor, physical interactions of the one or more first users with the second user based on the determined probability to maintain locus of the second user on the task, wherein managing the physical interactions includes:
        establishing a communication session with the user devices of the one or more first users over a wireless network to communicate over the communication session a delay for the physical interactions;
        determining availability of the second user based on a change in the level of concentration determined from the image processing of the captured images; and
        communicating over the communication session with the user devices of the one or more first users to initiate the physical interactions when the second user becomes available; and
    updating, via the processor during the roaming, the user devices within the proximity of the user device of the second user for managing the physical interactions based on movement of the plurality of user devices within the physical area.

2. The method of claim 1, further comprising:
    identifying a first user in proximity of the second user;
    determining a first probability indicating that a physical interaction between the first user and the second user is likely;
    determining a second probability indicating that the likely interaction is likely a negative interaction causing loss of focus by the second user; and
    managing the negative interaction between the first user and second user based on the second probability to maintain focus of the second user.

3. The method of claim 2, wherein managing the negative interaction further comprises:
    notifying the first user to avoid interaction with the second user.

4. The method of claim 2, wherein managing the negative interaction further comprises:
    negotiating with the first user to identify an opportunity to physically interact with the second user.

5. The method of claim 1, further comprising:
    identifying a plurality of first users in proximity of the second user;
    determining a first probability indicating that a physical interaction between the plurality of first users and the second user is likely; and
    determining an order for the plurality of first users to physically interact with the second user.

6. The method of claim 5, further comprising:
    determining a second probability indicating that the likely interaction is likely a negative interaction causing loss of focus by the second user; and
    managing the negative interaction between the plurality of first users and second user based on the second probability to maintain focus of the second user.

7. The method of claim 1, wherein managing physical interactions further comprises:
    notifying the identified one or more first users within proximity of the second user to avoid physically interacting with the second user in response to a private mode being enabled for the second user.

8. A system for managing physical interactions between users comprising:
- a transceiver; and
- at least one processor configured to:
    - detect, via the transceiver, wireless signals transmitted by a plurality of user devices within a physical area over time as the plurality of user devices roam to different locations within the physical area and derive strengths of the wireless signals detected during the roaming of the plurality of user devices;
    - identify, during the roaming, when the user devices of one or more first users roam within proximity of a user device of a second user in the physical area based on the strengths of the wireless signals transmitted by the plurality of roaming user devices;
    - in response to identifying the user devices of the one or more first users during the roaming:
        - monitor actions of the second user to determine a level of concentration of the second user in performing a task, wherein monitoring actions of the second user includes capturing images of the second user and performing image processing on the captured images of the second user to determine the level of concentration based on an amount of motion of the second user identified within the captured images from the image processing;
        - perform machine learning by applying a machine learning model to determine a probability of a physical interaction of the one or more first users with the second user causing loss of focus by the second user, wherein the machine learning model is trained with past locations and physical interactions of the users of the plurality of user devices; and
        - manage physical interactions of the one or more first users with the second user based on the determined probability to maintain focus of the second user on the task, wherein managing the physical interactions includes:
            - establishing a communication session with the user devices of the one or more first users over a wireless network to communicate over the communication session a delay for the physical interactions;
            - determining availability of the second user based on a change in the level of concentration determined from the image processing of the captured images; and
            - communicating over the communication session with the user devices of the one or more first users to initiate the physical interactions when the second user becomes available; and
    - update, during the roaming, the user devices within the proximity of the user device of the second user for managing the physical interactions based on movement of the plurality of user devices within the physical area.

9. The system of claim 8, wherein the at least one processor is further configured to:
- identify a first user in proximity of the second user;
- determine a first probability indicating that a physical interaction between the first user and the second user is likely;
- determine a second probability indicating that the likely interaction is likely a negative interaction causing loss of focus by the second user; and
- manage the negative interaction between the first user and second user based on the second probability to maintain focus of the second user.

10. The system of claim 9, wherein managing the negative interaction further comprises:
- notifying the first user to avoid interaction with the second user.

11. The system of claim 9, wherein managing the negative interaction further comprises:
- negotiating with the first user to identify an opportunity to physically interact with the second user.

12. The system of claim 8, wherein the at least one processor is further configured to:
- identify a plurality of first users in proximity of the second user;
- determine a first probability indicating that a physical interaction between the plurality of first users and the second user is likely;
- determine an order for the plurality of first users to physically interact with the second user;
- determine a second probability indicating that the likely interaction is likely a negative interaction causing loss of focus by the second user; and
- manage the negative interaction between the plurality of first users and second user based on the second probability to maintain focus of the second user.

13. The system of claim 8, wherein managing physical interactions further comprises:
- notifying the identified one or more first users within proximity of the second user to avoid physically interacting with the second user in response to a private mode being enabled for the second user.

14. A computer program product for managing physical interactions between users, the computer program product comprising one or more non-transitory computer readable storage media collectively having computer readable program code embodied therewith, the computer readable program code executable by at least one processor to cause the at least one processor to:
- detect, via a transceiver, wireless signals transmitted by a plurality of user devices within a physical area over time as the plurality of user devices roam to different locations within the physical area and derive strengths of the wireless signals detected during the roaming of the plurality of user devices;
- identify, during the roaming, when the user devices of one or more first users roam within proximity of a user device of a second user in the physical area based on the strengths of the wireless signals transmitted by the plurality of roaming user devices;
- in response to identifying the user devices of the one or more first users during the roaming:
    - monitor actions of the second user to determine a level of concentration of the second user in performing a task, wherein monitoring actions of the second user includes capturing images of the second user and performing image processing on the captured images of the second user to determine the level of concentration based on an amount of motion of the second user identified within the captured images from the image processing;
    - perform machine learning by applying a machine learning model to determine a probability of a physical interaction of the one or more first users with the second user causing loss of focus by the second user, wherein the machine learning model is trained with past locations and physical interactions of the users of the plurality of user devices; and manage physical interactions of the one or more first users with the second user based on the determined probability to maintain focus of the second user on the task, wherein managing the physical interactions includes:
- establishing a communication session with the user devices of the one or more first users over a wireless network to communicate over the communication session a delay for the physical interactions;
- determining availability of the second user based on a change in the level of concentration determined from the image processing of the captured images; and
- communicating over the communication session with the user devices of the one or more first users to initiate the physical interactions when the second user becomes available; and update, during the roaming, the user devices within the proximity of the user device of the second user for managing the physical interactions based on movement of the plurality of user devices within the physical area.

15. The computer program product of claim 14, wherein the computer readable program code is further configured to cause the at least one processor to:
- identify a first user in proximity of the second user;
- determine a first probability indicating that a physical interaction between the first user and the second user is likely;
- determine a second probability indicating that the likely interaction is likely a negative interaction causing loss of focus by the second user; and
- manage the negative interaction between the first user and second user based on the second probability to maintain focus of the second user.

16. The computer program product of claim 15, wherein managing the negative interaction further comprises:
- notifying the first user to avoid interaction with the second user.

17. The computer program product of claim 15, wherein managing the negative interaction further comprises:
- negotiating with the first user to identify an opportunity to physically interact with the second user.

18. The computer program product of claim 14, wherein the computer readable program code is further configured to cause the at least one processor to:
- identify a plurality of first users in proximity of the second user;
- determine a first probability indicating that a physical interaction between the plurality of first users and the second user is likely; and
- determine an order for the plurality of first users to physically interact with the second user.

19. The computer program product of claim 18, wherein the computer readable program code is further configured to cause the at least one processor to:
- determine a second probability indicating that the likely interaction is likely a negative interaction causing loss of focus by the second user; and
- manage the negative interaction between the plurality of first users and second user based on the second probability to maintain focus of the second user.

20. The computer program product of claim 14, wherein managing physical interactions further comprises:
- notifying the identified one or more first users within proximity of the second user to avoid physically interacting with the second user in response to a private mode being enabled for the second user.

* * * * *